3,468,981
POLYMERIC PRODUCTS FORMED FROM DI-
PHENYLTETRACHLOROTRIPHOSPHONITRILE
AND A DIHYDROXY AROMATIC COMPOUND
Irving I. Bezman, Pittsburgh, Pa., assignor to Armstrong
Cork Company, Lancaster, Pa., a corporation of
Pennsylvania
No Drawing. Filed Jan. 13, 1966, Ser. No. 520,345
Int. Cl. C07d *105/02;* C07f *9/30;* C08g *33/16*
U.S. Cl. 260—927                             4 Claims

ABSTRACT OF THE DISCLOSURE

A polymeric product formed from diphenyltetrachloro-triphosphonitrile and a dihydoxy aromatic compound. The polymeric product is preferably produced in the presence of a tertiary amine acid acceptor and is useful as a resinous coating for metals.

---

This invention relates broadly to polymeric products of high heat stability comprised of the condensation product produced by the reaction of diphenyltetrachlorotriphosphonitrile and a dihydroxy aromatic compound.

The diphenyltetrachlorotriphosphonitrile has the following structural formula and contains 4 reactive chlorine atoms which are attached to two of the phosphorus atoms as shown:

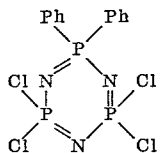

The chlorine atoms in the diphenyltetrachlorotriphosphonitrile function as acid chlorides and are reactive with compounds containing active hydrogen atoms, namely dihydroxy aromatic compounds of the following structure:

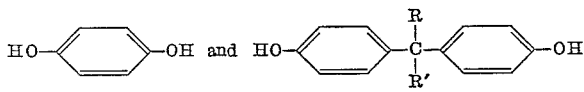

wherein R and R' are members selected from the group consisting of hydrogen and an alkyl radical containing from 1 to 2 carbon atoms. Representative of such dihydroxy aromatic compounds are hydroquinone and p,p'-isopropylidenediphenol.

The polymeric products are formed through a polycondensation reaction in which the chlorine atoms of the phosphonitrile react with the hydrogens of the diol, forming a ≡P—O—R— bond and eliminating hydrogen chloride. A tertiary amine is employed to combine with the by-product acid. In so doing, it helps both to overcome any secondary reactions in which the free acid might participate and to accelerate the polycondensation reaction. Because each phosphonitrile molecule contains four reactive sites (the chlorine atoms), complete reaction would require two diol molecules and would result in a three-dimensional cross-linked product, which would be insoluble. In theory, a ratio of one mole of diol per mole of phosphonitrile should give a linear polymer having the structure (when hydroquinone is the diol)

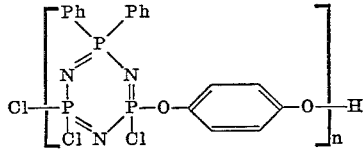

However, the polycondensation reactions are sluggish and it has been found that an excess of diol, even over that required by theory to give a completely cross-linked structure, is useful. As carried out, the polycondensations give low molecular weight polymers, a major proportion of which are soluble in common solvents such as acetone, methylethyl ketone, and n-butanol. Solutions of the products in these solvents can be used to form coatings on metal surfaces. The coated articles can be dried at low temperatures to remove solvent and then heated to elevated temperatures at which further reaction between residual chlorine atoms and hydroxy groups can take place to convert the coating to a cross-linked, insoluble product which is flexible, resistant to high temperature, and is an electrical insulator.

Because the phosphorus-chloride bond is subject to degradative hydrolysis, good hydrolytic stability of the coating in its final, baked form depends on the completeness of the reaction of the residual chlorine atoms with available hydrogen from the free ends of the dihydroxy compounds. The phosphonitrile used in this invention has only four replaceable chlorine atoms, the other two positions being occupied by the phenyl groups which, by virture of the phosphorus-carbon bond, exhibit both excellent thermal and hydrolytic stability.

With regard to the mole ratios of reactants, it is possible to employ the phosphonitrile and dihydroxy compound in a 1:1 mole ratio as a minimum. However, soluble products are obtained when as much as 1.5 moles or more of dihydroxy compound are used, for each equivalent weight of chlorine present in the phosphonitrile, i.e., the phosphonitrile to dihydroxyl mole ratio can be as high as 1:6 or more. In theory, for each mole of dihydroxy compound (or phosphonitrile) which reacts, two moles of hydrogen chloride are released and, therefore, two moles of acid acceptor are required. If the reactants are used in a 1:1 mole ratio, two moles of acid acceptor are used for each mole of dihydroxy compound. When, however, an excess of dihydroxy compound is used, i.e., more than two moles per mole of phosphonitrile, then a number of moles of acid acceptor equal to that of the dihydroxy compound is adequate.

Temperatures at which the reaction is carried out can be chosen within a wide range. The minimum temperature used is that at which the components liquefy. This can be as low as 100° C. The upper temperature limit is about 300° C. The higher reaction temperatures allow formation of useful products in a shorter time. Thus, at 125° C. a product was formed in 18 hours; at 220° a product was obtained in about six hours.

Processing of the reaction product is simple. It is removed from the reaction tube with acetone, dioxan, or a mixture of the two. Some insoluble material is formed, consisting of the acid acceptor hydrochloride and also some polymeric material which is evidently cross-linked material. The amount of the insoluble material formed is related to the reaction parameters including reactant mole ratio and reaction temperature, heating rate, and time. It may be minimized by suitable adjustment of the parameters.

The material extracted by the acetone and/or dioxan, is recovered by first removing insoluble material by filtration and then adding the filtrate to an excess of water. The polymer is precipitated while by-product amine hydrochloride remains in the solution. The product, after separation by filtration, can then be washed with dilute (0.1 N) sodium hydroxide solution to remove unreacted dihydroxy compound. The product is then dried and ready for formulation into a coating composition by solution in a suitable solvent.

Suitable tertiary amine acid acceptors are those which are most basic, such as triethylamine, tributylamine, pyridine, and quinoline. For polycondensations carried out at relatively low temperatures, triethylamine is useful; for higher temperature reactions, the much higher boiling quinoline can be employed. A good general choice is pyridine.

The following examples will serve to ilustrate the invention more fully.

Example 1

A mixture of 2.0 grams diphenyltetrachlorotriphosphonitrile of the formula

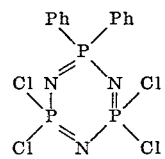

and 3.08 grams hydroquinone (a 1:6 mole ratio), together with 2.1 grams of pyridine, were placed in a thick walled tube, which was then sealed and heated at 120° to 125° C. for 18 hours. The tertiary amine was present on an equimolar basis with respect to the hydroquinone. After cooling, the contents were removed with dioxane to give a yellow oil which was isolated and treated with water to remove water-soluble by-products. This left an amber solid which was treated with acetone to give an acetone-soluble fraction. After removal of acetone, the solids were dissolved in n-butanol at 30% by weight solids content. The solution was coated out on highly polished chromium coated steel sheets at a 6 mil wet film thickness. The coated samples were put through a drying and curing cycle involving several hours at room temperature, 3 hours at 150° C., and 15 minutes at 260° C. The coatings were adherent to the metal and could take a mandrel bend of ⅜–½ inch without cracking or losing adhesion to the metal. The polymeric product lost only 20% of its weight after being heated to and then held at 500° C. for more than one hour.

Example 2

A mixture of 1.6 grams of the diphenyltetrachlorotriphosphonitrile used in Example 1, 5.2 grams of p,p'-isopropylidenediphenol, and 2.0 grams of pyridine, representing a mole ratio of 1.0:6.1:6.8, respectively, was placed in a thick wall tube, which was then sealed and placed in a furnace preheated to 140° C. After about an hour the temperature was raised to 175° C. and, after about two hours at 175° C., the temperature was raised to 220° C. and maintained there for an additional hour. Total reaction time was approximately six hours. After removal and cooling, the tube contents were treated with a 50-50 (vol.) mixture of acetone and dioxan; substantially all of the product was soluble. After removal of insoluble material by filtration, the filtrate was poured slowly into an excess of water which was stirred continuously. The product was precipitated as a viscous oil but continued washing to remove pyridine hydrochloride and unreacted dihydroxy compound converted the product to an amber powder. After separation and drying, the product was dissolved in methylethyl ketone at 33% solids content. The solution was coated out on highly polished chromium coated steel sheets at a wet film thickness of six mils. The coated samples were air-dried for two hours then heated up to a maximum temperature of 320° C. Total heating time was about one hour. Although the coating turned dark amber at this temperature, it withstood a ⅜″ mandrel bend without cracking and while still adhering to the metal surface.

I claim:
1. A polymeric product of high heat stability comprised of the condensation product produced by reacting, in relative proportions, one mole of diphenyltetrachlorotriphosphonitrile of the formula

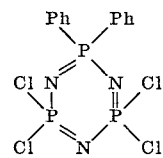

and correspondingly 1 to 7 moles of a member selected from the group consisting of

and

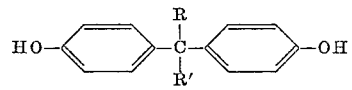

and mixtures thereof, wherein R and R' are members selected from the group consisting of hydrogen and an alkyl radical containing 1 to 2 carbon atoms, at a temperature within the range of 100° to 300° C.

2. A polymeric product in accordance with claim 1 produced in the presence of a tertiary amine acid acceptor.

3. A polymeric product of high heat stability in accordance with claim 2 wherein the dihydroxy aromatic compound is p,p'-isopropylidenediphenol.

4. A polymeric product of high heat stability in accordance with claim 2 wherein the dihydroxy aromatic compound is hydroquinone.

References Cited

UNITED STATES PATENTS 2,866,773  12/1958  Aubrey _____ 260—54 XR
3,108,989  10/1963  Rice et al. _____ 260—887
3,121,704   2/1964  Rice et al. _____ 260—54

OTHER REFERENCES

Herring et al., Inorganic Chemistry, vol. 4, No. 7, (July 1965), pp. 1012-6.

CHARLES B. PARKER, Primary Examiner

ANTON H. SUTTO, Assistant Examiner

U.S. Cl. X.R.

117—62.2, 127; 260—47, 973